(12) United States Patent
Röhm

(10) Patent No.: US 6,889,986 B2
(45) Date of Patent: May 10, 2005

(54) DRILL CHUCK WITH CUSHIONED TIGHTENING RING

(75) Inventor: Günter Horst Röhm, Sontheim (DE)

(73) Assignee: Rohm GmbH, Sontheim (DE)

( * ) Notice: Subject to any disclaimer, the term of this patent is extended or adjusted under 35 U.S.C. 154(b) by 574 days.

(21) Appl. No.: 09/924,324

(22) Filed: Aug. 8, 2001

(65) Prior Publication Data

US 2002/0022442 A1 Feb. 21, 2002

(51) Int. Cl.[7] .............................................. B23B 31/12
(52) U.S. Cl. ........................................ 279/62; 279/902
(58) Field of Search .............................. 279/60, 61, 62, 279/902

(56) References Cited

U.S. PATENT DOCUMENTS

| | | | | |
|---|---|---|---|---|
| 3,727,931 A | * | 4/1973 | Wightman et al. | 279/62 |
| 3,807,745 A | * | 4/1974 | Bent | 279/60 |
| 5,125,673 A | * | 6/1992 | Huff et al. | 279/60 |
| 5,174,588 A | * | 12/1992 | Reibetanz et al. | 279/62 |
| 5,765,839 A | | 6/1998 | Rohm | |
| 6,070,884 A | * | 6/2000 | Mack | 279/62 |
| 6,575,478 B2 | * | 6/2003 | Röhm et al. | 279/62 |

* cited by examiner

Primary Examiner—Daniel W. Howell
(74) Attorney, Agent, or Firm—Herbert Dubno; Andrew Wilford

(57) ABSTRACT

A drill chuck has a chuck body formed with a plurality of forwardly open angled guide passages and with a radially open groove having an axially rearwardly directed front face and an axially forwardly directed rear face. Respective jaws displaceable in the passages each have a row of radially outwardly directed teeth exposed at the groove. A tightening ring engaged in the groove and having an internal screwthread meshing with the teeth of the jaws is formed with a front face axially confronting the front groove face and can rotate on the body about the axis. An angled front spring washer engaged between the front faces is elastically deformable on axial forward displacement of the tightening ring to permit limited relative axial movement of the ring and body.

12 Claims, 4 Drawing Sheets

DRILL CHUCK WITH CUSHIONED TIGHTENING RING

FIELD OF THE INVENTION

The present invention relates to a chuck. More particularly this invention concerns a drill chuck used in a hammer drill or the like.

BACKGROUND OF THE INVENTION

A standard drill chuck has a chuck body centered on an axis and formed on the axis with a rearwardly open hole or other formation adapted for engagement by a spindle or the like of a drive unit, and with a plurality of forwardly open angled guides adapted to receive respective jaws for gripping a tool at a front end of the chuck body. The jaws have outer edges formed with teeth that mesh with an internal screwthread of a tightening ring rotatable on the body about the axis and constrained against axial movement relative to the body so that, when the tightening ring is rotated, the jaws are moved forward to grip the tool or backward to release it. As a rule the tightening ring is received in a groove whose front flank is formed by a rearwardly directed shoulder of the chuck body and whose rear flank is formed by a roller bearing in turn bearing axially backward on a forwardly directed shoulder of the chuck body.

To tighten or loosen the chuck the standard procedure is for the user to grip the tightening ring or a sleeve attached to it so as to prevent it from rotating, and then actuated the drill's power unit to rotate the chuck body in the appropriate direction, thereby either advancing or retracting the jaws. The jaw teeth are normally formed between forward and rearwardly directed shoulders of the jaws and, when a front or rear end position is reached, the respective shoulder bottoms on the tightening ring or associated structure to prevent further rotation and movement.

The problem with this structure is that it is possible to wedge or jam the chuck, forcing the parts into such tight engagement with each other that subsequent rotation in the opposite direction is very difficult. Furthermore such bottoming out of the parts on each other at the end of a tightening or, more likely, a loosening operation can lead to substantial strain on and wear of the engaging parts.

OBJECTS OF THE INVENTION

It is therefore an object of the present invention to provide an improved drill chuck.

Another object is the provision of such an improved drill chuck which overcomes the above-given disadvantages, that is which prevents the tightening ring from jamming at the end of a tightening or loosening structure.

SUMMARY OF THE INVENTION

A drill chuck has according to the invention a chuck body centered on an axis and formed with a plurality of forwardly open angled guide passages spaced about the axis and with a radially open groove having an axially rearwardly directed front face and an axially forwardly directed rear face. Respective jaws displaceable generally axially in the passages each have a row of radially outwardly directed teeth exposed at the groove. A tightening ring engaged in the groove between the faces thereof and having an internal screwthread meshing with the teeth of the jaws is formed with a front face axially confronting the front groove face and can rotate on the body about the axis so that rotation of the ring on the body in a tightening direction moves the jaws axially forward and radially together and opposite rotation moves them axially backward and radially apart. An angled front spring washer engaged between the front faces is elastically deformable on axial forward displacement of the tightening ring to permit limited relative axial movement of the ring and body.

With this system, therefore, the spring washer will cushion the tightening ring and prevent it from suddenly entering into contact with and jamming on the chuck body. Instead, as the chuck is tightened the washer will deform elastically, bringing rotation of the ring to a gentle stop.

According to the invention the spring washer is dished and engages at least one of the front faces in line contact. The front faces are planar, parallel to each other, and perpendicular to the axis. Thus the spring washer is a Belleville washer.

The groove in accordance with the invention has an axially forwardly directed rear face and an angled rear spring washer is engaged between this rear face and the ring and elastically deforms on axial rearward displacement of the tightening ring. Thus the tightening ring is cushioned both for tightening and loosening.

Formations between the chuck body and the rear washer prevent rotation of the rear washer relative to the body according to the invention. These formations can include at least one radially directed bump. They can also include a radially outwardly open pocket on the body and a radially inwardly projecting bump formed on the rear washer and engaged in the pocket. In another system the formations include radially inwardly projecting tabs formed on the rear washer and engaging in the guide passages. It is also possible for the formations to include a plurality of angularly spaced and radially outwardly open pockets on the body and complementary radially inwardly projecting bumps formed on the rear washer and engaged in the pockets. In yet another system the formations include axially extending and radially outwardly projecting teeth formed on the body and complementary radially inwardly projecting teeth formed on the ring and engaging the body teeth. These latter formations can include axially extending and radially outwardly projecting teeth formed on the jaws and engaging the ring teeth.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
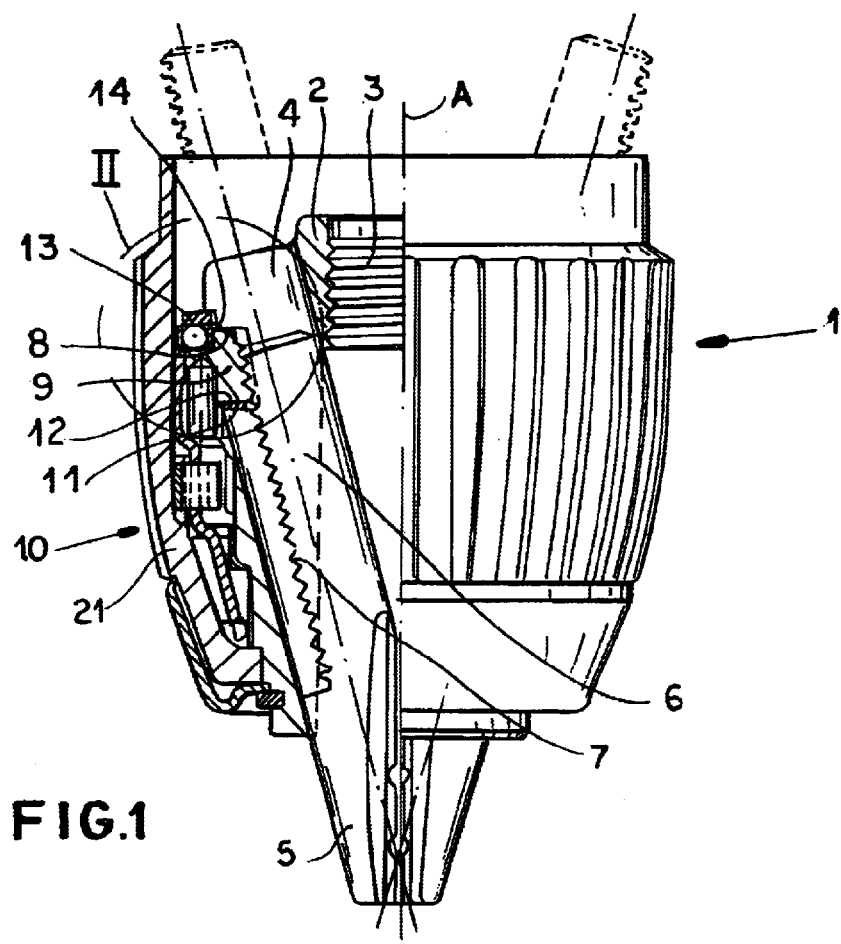
FIG. 1 is a side view partly in axial section through a chuck according to the invention.
Figure 2:
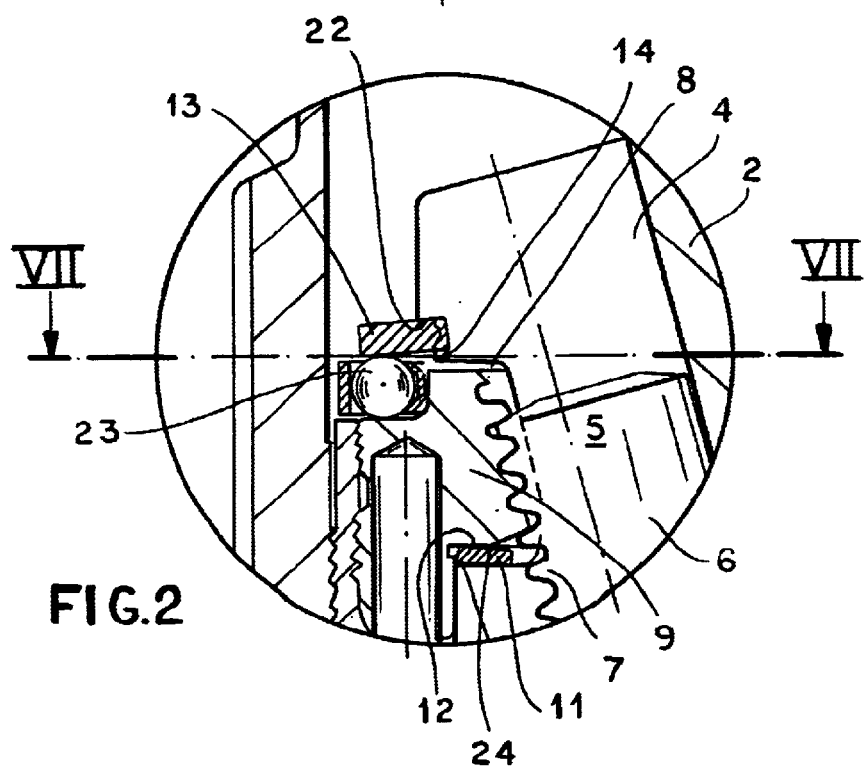
FIG. 2 is a large-scale view of the detail indicated at II in FIG. 1.
Figure 7:
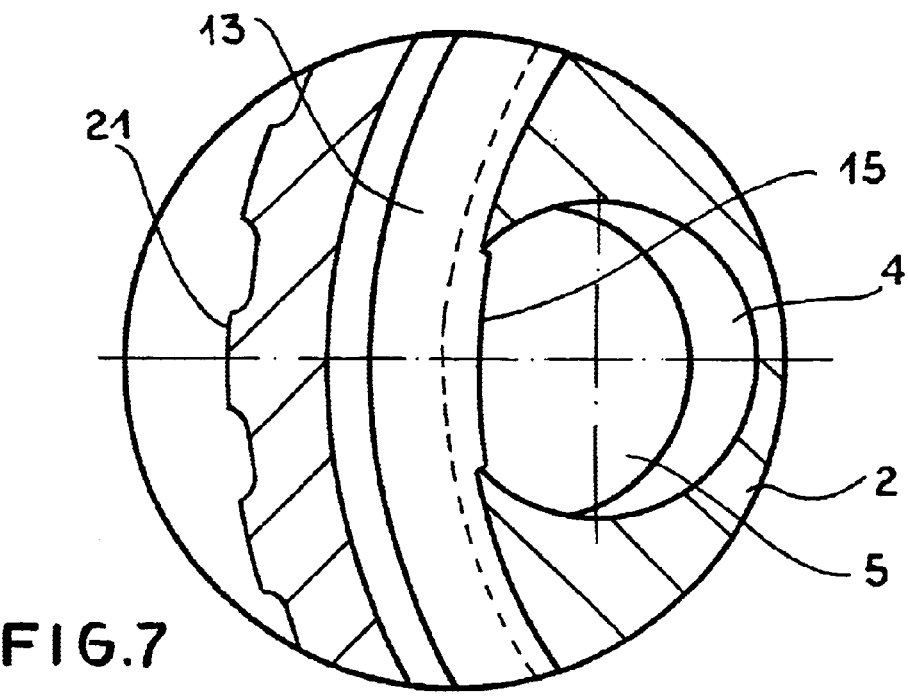
FIG. 7 is a section taken along line VII—VII of FIG. 2.

As seen in FIGS. 1, 2, and 7, a chuck 1 according to the invention has a chuck body 2 centered on an axis A and having a rearwardly open spindle-receiving threaded bore 3 and three angled guide passages 4 receiving respective jaws 5. Rear ends of the jaws 5 are formed with radially outwardly directed teeth 7 meshing with an internal screwthread 6 of a tightening ring 9 received in a radially outwardly open groove 8 of the chuck body 1. This groove 8 has a rearwardly directed planar front flank 11 lying in a plane perpendicular to the axis A and confronting a forwardly directed parallel front face 24 of the ring 9 and a forwardly directed planar rear flank 22 confronting the front flank 11.

A locking system 10 is provided between the tightening ring 0 and an outside adjustment sleeve 21 rotatable on the body 2 about the axis A. Such a locking system is described in U.S. Pat. No. 5,765,839.

According to the invention a spring washer 12 is provided between the front flank 11 and the planar front face 24 the ring 9, and another such washer 13 is provided between the rear flank 22 and a roller bearing 23 forming part of the ring 9. These washers 12 and 13 are formed of spring steel and each have parallel frustoconical faces forming a very small acute angle with respective planes perpendicular to the axis A. Thus they are limitedly axially deformable to cushion forward and rearward movement of the ring 8 relative to the body 2. As a result at the end of a loosening or tightening operation, the respective ring 12 or 13 will deform somewhat to gently stop the parts, thereby preventing the ring 9 from jamming on the chuck body 1.

FIG. 2 shows how the rear Belleville washer 13 has bumps 14 that engage the body 2 and prevent it from rotating relative thereto. FIG. 7 shows how the washer 13 also or alternatively has radially inwardly directed bumps 15 that engage in the passages 4 to rotationally lock the ring 13 to the body 2.

Figure 4:
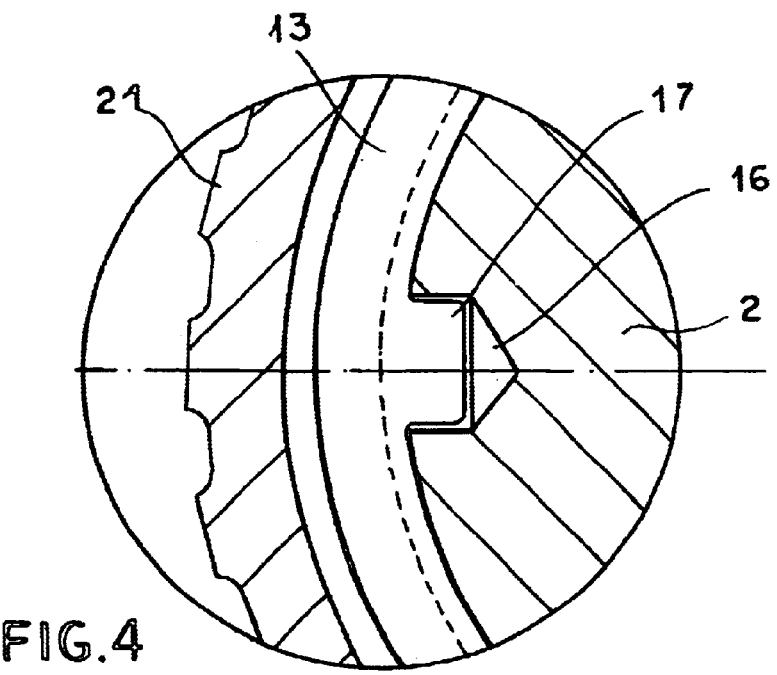
FIG. 4 is a section taken along line IV—IV of FIG. 3.
Figure 3:
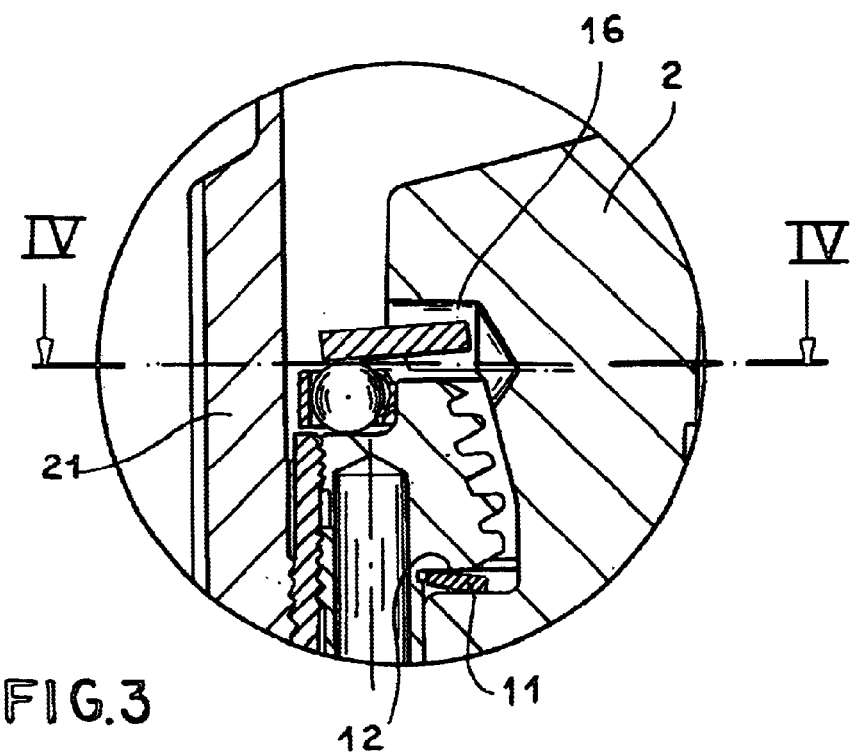
FIG. 3 is a view like FIG. 2 of an alternative system according to the invention.
Figure 6:
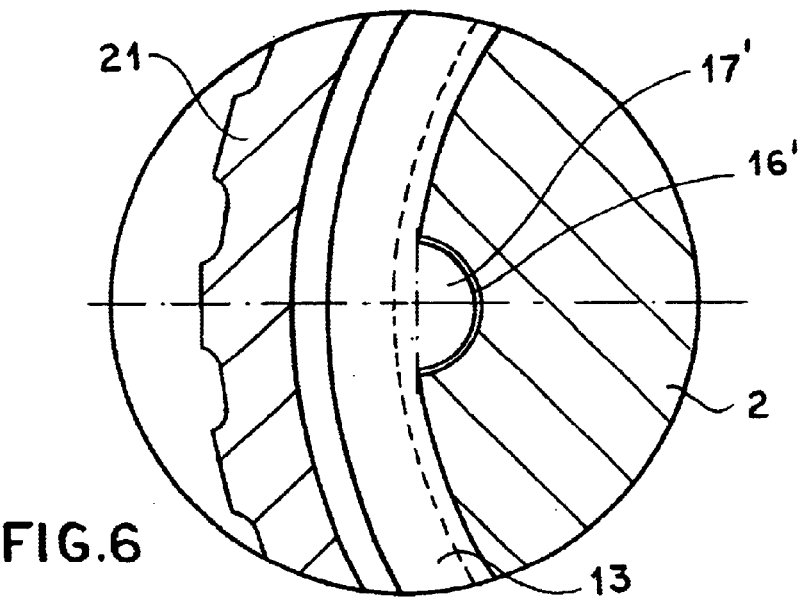
FIG. 6 is a section taken along line VI—VI of FIG. 5.
Figure 5:
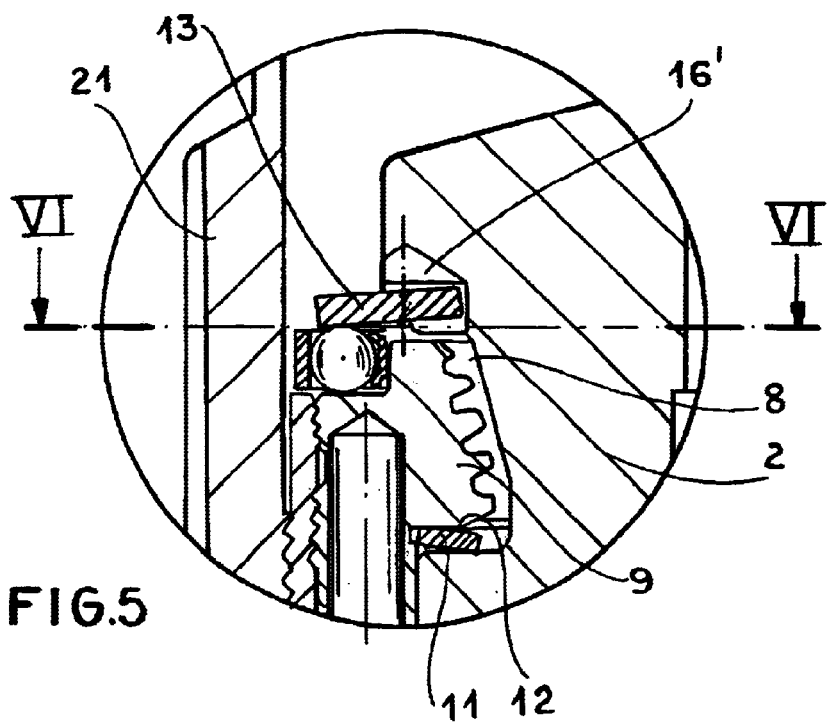
FIG. 5 is a view like FIG. 2 of yet another system in accordance with the invention.

FIGS. 3 and 4 show a system where the body 2 is formed between adjacent passages 4 with radially outwardly directed pockets 16 into which fit bumps or tabs 17 projecting radially inward from the ring 13. These formations 16 and 17 are of complementary square-sided shape, while in FIG. 6 functionally identical formations 16' and 17' are of complementary semicircular shape.

Figure 8:
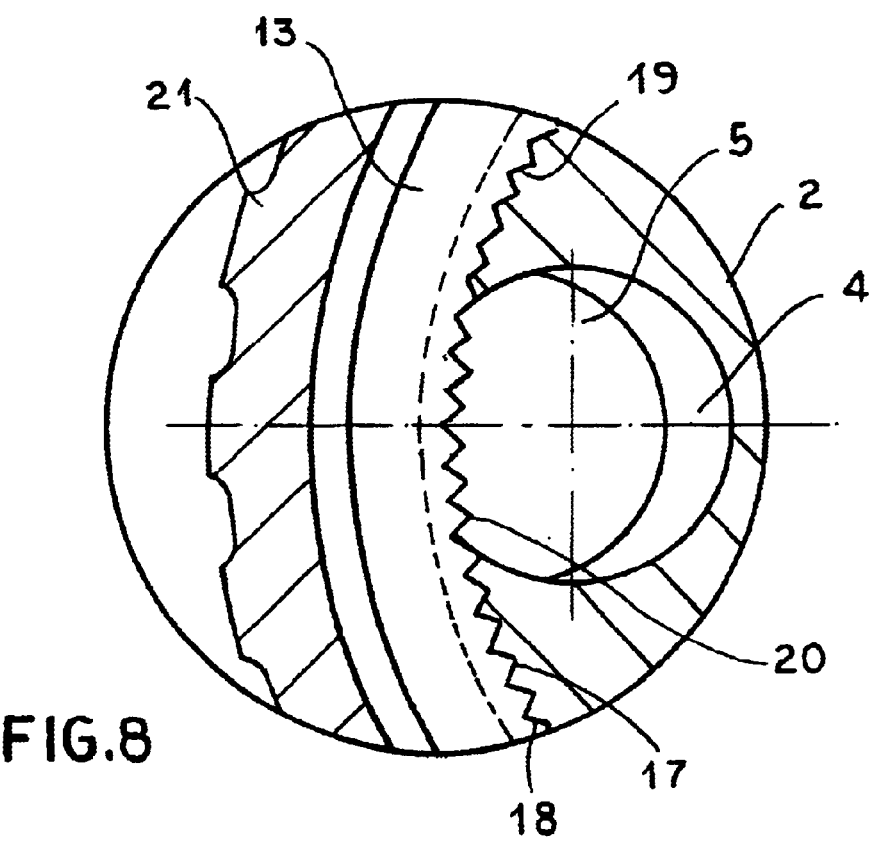
FIG. 8 is a view like FIG. 7 of an alternative chuck according to the invention.

The system of FIG. 8 has axially extending and radially inwardly projecting ridges or teeth 17 on the washer 13 engaging radially outwardly directed teeth 18 and 19 formed on the body 2 and teeth 20 on the jaws 5 to rotationally couple these parts to one another.

I claim:

1. A drill chuck comprising:
   a chuck body centered on an axis and formed with a plurality of forwardly open angled guide passages spaced about the axis and with a radially open groove having an axially rearwardly directed front face and an axially forwardly directed rear face;
   respective jaws displaceable generally axially in the passages and each having a row of radially outwardly directed teeth exposed at the groove;
   a tightening ring engaged in the groove between the faces thereof, having an internal screwthread meshing with the teeth of the jaws, formed with a front face axially confronting the front groove face, and rotatable on the body about the axis, whereby rotation of the ring on the body in a tightening direction moves the jaws axially forward and radially together and opposite rotation moves them axially backward and radially apart; and
   an angled front spring washer having a front face bearing axially forward on the front face of the groove and a rear face bearing axially rearward on the front face of the ring and axially elastically deformable on axial forward displacement of the tightening ring to permit limited relative axial movement of the ring and body.

2. A drill chuck comprising:
   a chuck body centered on an axis and formed with a plurality of forwardly open angled guide passages spaced about the axis and with a radially open groove having an axially rearwardly directed front face and an axially forwardly directed rear face;
   respective jaws displaceable generally axially in the passages and each having a row of radially outwardly directed teeth exposed at the groove;
   a tightening ring engaged in the groove between the faces thereof, having an internal screwthread meshing with the teeth of the jaws, formed with a front face axially confronting the front groove face, and rotatable on the body about the axis, whereby rotation of the ring on the body in a tightening direction moves the jaws axially forward and radially together and opposite rotation moves them axially backward and radially apart; and
   an angled front spring washer engaged between the front faces and elastically deformable on axial forward displacement of the tightening ring to permit limited relative axial movement of the ring and body, the front spring washer is being dished and engaging at least one of the front faces in line contact.

3. The drill chuck defined in claim 2 wherein the front faces are planar, parallel to each other, and perpendicular to the axis.

4. A drill chuck comprising:
   a chuck body centered on an axis and formed with a plurality of forwardly open angled guide passages spaced about the axis and with a radially open groove having an axially rearwardly directed front face, an axially forwardly directed rear face, and an axially forwardly directed rear face;
   respective jaws displaceable generally axially in the passages and each having a row of radially outwardly directed teeth exposed at the groove;
   a tightening ring engaged in the groove between the faces thereof, having an internal screwthread meshing with the teeth of the jaws, formed with a front face axially confronting the front groove face, and rotatable on the body about the axis, whereby rotation of the ring on the body in a tightening direction moves the jaws axially forward and radially together and opposite rotation moves them axially backward and radially apart;
   an angled front spring washer engaged between the front faces and elastically deformable on axial forward displacement of the tightening ring to permit limited relative axial movement of the ring and body; and
   an angled rear spring washer engaged between the rear face and the ring and elastically deformable on axial rearward displacement of the tightening ring.

5. The drill chuck defined in claim 4, further comprising formations between the chuck body and the rear washer for preventing rotation of the rear washer relative to the body.

6. The drill chuck defined in claim 5 wherein the formations include at least one radially directed bump.

7. The drill chuck defined in claim 5 wherein the formations include a radially outwardly open pocket on the body and a radially inwardly projecting bump formed on the rear washer and engaged in the pocket.

8. The drill chuck defined in claim 5 wherein the formations include radially inwardly projecting tabs formed on the rear washer and engaging in the guide passages.

9. The drill chuck defined in claim 5 wherein the formations include a plurality of angularly spaced and radially outwardly open pockets on the body and angularly complementary radially inwardly projecting bumps formed on the rear washer and engaged in the pockets.

10. The drill chuck defined in claim 5 wherein the formations include axially extending and radially outwardly projecting teeth formed on the body and complementary radially inwardly projecting teeth formed on the ring and engaging the body teeth.

11. The drill chuck defined in claim 10 wherein the formations include axially extending and radially outwardly projecting teeth formed on the jaws and engaging the ring teeth.

12. The drill chuck defined in claim 4, further comprising a roller bearing between the rear washer and the tightening ring.

* * * * *

UNITED STATES PATENT AND TRADEMARK OFFICE
CERTIFICATE OF CORRECTION

PATENT NO. : 6,889,986 B2  
DATED : May 10, 2005  
INVENTOR(S) : Günter Horst Röhm It is certified that error appears in the above-identified patent and that said Letters Patent is hereby corrected as shown below:

<u>Title page,</u>  
Between items [65] and [51], item [30] should read as follows:  
-- [30]  Foreign Application Priority Data  
August 10, 2000         (DE) 100 39 013 --.

Signed and Sealed this

Thirtieth Day of August, 2005

JON W. DUDAS  
*Director of the United States Patent and Trademark Office*